US011933460B2

(12) United States Patent
Li et al.

(10) Patent No.: US 11,933,460 B2
(45) Date of Patent: Mar. 19, 2024

(54) LAMP BODY AND LAMP CUP THEREOF

(71) Applicants: SUZHOU OPPLE LIGHTING CO., LTD., Suzhou (CN); OPPLE LIGHTING CO., LTD., Shanghai (CN)

(72) Inventors: Guanlv Li, Suzhou (CN); Daoyin Zhang, Suzhou (CN); Yong Zhan, Suzhou (CN); Haijun Cai, Suzhou (CN)

(73) Assignees: SUZHOU OPPLE LIGHTING CO., LTD., Suzhou (CN); OPPLE LIGHTING CO., LTD., Shanghai (CN)

( * ) Notice: Subject to any disclaimer, the term of this patent is extended or adjusted under 35 U.S.C. 154(b) by 0 days.

(21) Appl. No.: 18/215,063

(22) Filed: Jun. 27, 2023

(65) Prior Publication Data

US 2023/0341096 A1 Oct. 26, 2023

Related U.S. Application Data

(63) Continuation of application No. PCT/CN2021/139044, filed on Dec. 17, 2021.

(30) Foreign Application Priority Data

Dec. 29, 2020 (CN) ........................ 202023281028.7

(51) Int. Cl.
*F21K 9/235* (2016.01)
*F21K 9/232* (2016.01)
*F21V 23/06* (2006.01)

(52) U.S. Cl.
CPC .............. *F21K 9/235* (2016.08); *F21K 9/232* (2016.08); *F21V 23/06* (2013.01)

(58) Field of Classification Search
CPC ........... F21K 9/235; F21K 9/232; F21V 23/06
See application file for complete search history.

(56) References Cited

FOREIGN PATENT DOCUMENTS

| | | | |
|---|---|---|---|
| CN | 204026238 | U | 12/2014 |
| CN | 204285056 | U | 4/2015 |
| CN | 204438011 | U | 7/2015 |
| CN | 213810131 | U | 7/2021 |
| GB | 382158 | A | 10/1932 |
| JP | 10275592 | A | 10/1998 |

OTHER PUBLICATIONS

Chen, CN-204438011-U, Jul. 2015 (Year: 2015).*
Liu, CN-103174960-A, Jun. 2013 (Year: 2013).*
Li, CN-115370976-A, Nov. 2022 (Year: 2022).*
Li, CN-113280276-A, Aug. 2021 (Year: 2021).*
International Search Report of PCT Application No. PCT/CN2021/139044 dated Mar. 18, 2022 with English translation, (5p).

* cited by examiner

*Primary Examiner* — Mary Ellen Bowman
(74) *Attorney, Agent, or Firm* — Arch & Lake LLP

(57) ABSTRACT

The present disclosure discloses a lamp body and a lamp cup. An installation ring platform is provided on a bottom of the lamp cup, and the installation ring platform is provided with a plurality of wire clamping grooves the plurality of wire clamping grooves are arranged along a circumferential direction of the installation ring platform; and a bayonet that is provided on a top of the wire clamping groove, and the bayonet is located on a top surface of the installation ring platform.

10 Claims, 3 Drawing Sheets

LAMP BODY AND LAMP CUP THEREOF

CROSS-REFERENCE TO RELATED APPLICATIONS

This application is based upon and claims the priority of PCT patent application No. PCT/CN2021/139044 filed on Dec. 17, 2021 which claims priority to the Chinese patent application No. 202023281028.7, filed on Dec. 29, 2020, the entire contents of which are hereby incorporated by reference herein for all purposes.

TECHNICAL FIELD

The present disclosure relates to a field of lighting technology, and more particularly, to a lamp body and a lamp cup thereof.

BACKGROUND

With development of a lighting industry, various lighting sources are widely emerging in the market, among which a point light source is a common light source favored by the market. As a point light source, such as an E27 lamp head, its principle is to achieve the purpose of a lamp body to emit light by contacting a wire, specifically a neutral wire, with a metal inside the lamp head for conduction. In an actual assembly process, the neutral wire is usually snapped on a lamp cup, so as to form an effective contact with the lamp head by fixing the neutral wire.

SUMMARY

The present disclosure discloses a lamp body and a lamp cup.

A lamp cup is disclosed in the present disclosure. The lamp cup may include an installation ring platform that may be protrudingly provided on a bottom end of the lamp cup, and the installation ring platform may be provided with a plurality of wire clamping grooves; the plurality of wire clamping grooves may be arranged along a circumferential direction of the installation ring platform; and a bayonet may be provided on a top of the wire clamping groove, and the bayonet may be located on a top surface of the installation ring platform.

A lamp body is disclosed in the present disclosure. The lamp body may include a lamp head, an electric wire, a photoelectric panel, a bulb shell and a lamp cup.

The lamp cup may include an installation ring platform that may be protrudingly provided on a bottom end of the lamp cup, and the installation ring platform may be provided with a plurality of wire clamping grooves; the plurality of wire clamping grooves may be arranged along a circumferential direction of the installation ring platform; and a bayonet may be provided on a top of the wire clamping groove, and the bayonet may be located on a top surface of the installation ring platform.

The lamp head, the lamp cup and the bulb shell may be sequentially connected to form an accommodating cavity in the interior of the lamp body, and the electric wire and the photoelectric panel may be all located in the accommodating cavity; the electric wire may include a neutral wire and a live wire, both ends of the neutral wire may be a first end and a second end respectively, the neutral wire may be snapped into the wire clamping groove, the first end may be electrically connected to the photoelectric panel, and the second end may be electrically connected to the lamp head; and both ends of the live wire may be electrically connected to the photoelectric panel and the lamp head respectively.

It is to be understood that the foregoing general description and the following detailed description are exemplary and explanatory only and are not restrictive of the disclosure.

BRIEF DESCRIPTION OF THE DRAWINGS

The drawings described herein are used to provide a further understanding of the present disclosure, and constitute a part of the present disclosure. The schematic examples of the present disclosure and descriptions thereof are used to explain the present disclosure, and do not constitute improper limitations to the present disclosure. In the drawings.

DETAILED DESCRIPTION

In order to make the objective, technical solutions and advantages of the present disclosure clearer, the technical solutions of the present disclosure will be clearly and completely described below in conjunction with examples of the present disclosure and corresponding drawings. Apparently, the described examples are only some of rather than all of the examples of the present disclosure. Based on the examples of the present disclosure, all other examples obtained by a person of ordinary skill in the art without creative effort fall into the protection scope of the present disclosure.

The technical solutions disclosed by various examples of the present disclosure will be described in detail below in conjunction with the drawings.

Reference signs used in this disclosure may include:

1—lamp head, 2—lamp body, 21—wire clamping groove, 22—clamping block, 23—installation ring platform, 24—assembly ring portion, 3—electric wire, 3A—neutral wire, 3B—live wire, 4—photoelectric panel, 5—bulb shell.

For a point light source such as an E27 lamp head, Some structure adopted, may have following issues in actual assembly, especially in the process of mass assembly. If a live wire is located between the neutral wire and a clamping groove of the lamp cup, then the live wire may interfere the snapped connection between the neutral wire and the clamping groove, so that the neutral wire and the clamping groove cannot form an effective connection; moreover, deliberately avoiding interference caused by the live wire during the assembly process will lead to a decrease in assembly efficiency.

Figure 1:
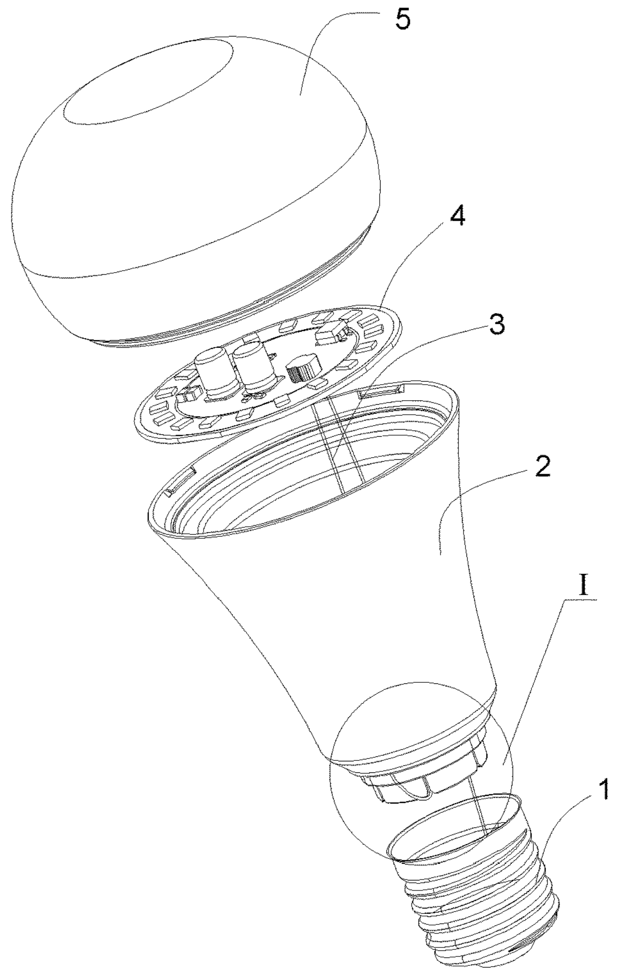
FIG. 1 is an overall structural diagram of a lamp body disclosed by an example of the present disclosure.
Figure 3:
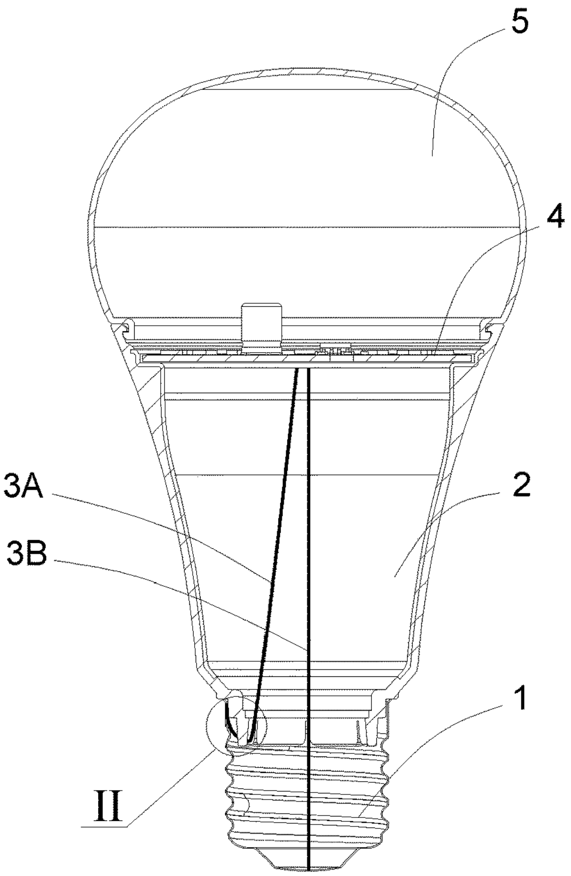
FIG. 3 is a sectional view of the lamp body disclosed by an example of the present disclosure.

A lamp body disclosed by the present example is illustrated in FIG. 1 and FIG. 3, which includes a lamp head 1, a lamp cup 2, an electric wire 3, a photoelectric panel 4 and a bulb shell 5. The lamp head 1, the lamp cup 2 and the bulb shell 5 are sequentially connected to form an accommodating cavity inside the lamp body, and the electric wire 3 and the photoelectric panel 4 are all located in the accommodating cavity.

More specifically, a plurality of elastic hooks are arranged on the lamp cup 2, and the plurality of elastic hooks are located at a top of the lamp cup 2 and are arranged around an inner periphery of the lamp cup 2. The bulb shell 5 is provided with an elastic ring groove, and the elastic ring groove is located at an opening on a bottom of the bulb shell 5 and is arranged around a periphery of the bulb shell 5. The detachable connection between the lamp cup 2 and the bulb shell 5 is achieved through an elastic snapped connection between the elastic hooks and the elastic ring groove, and the convenience of assembling the lamp body is improved.

An overlapping surface is also provided inside the lamp cup 2, the overlapping surface is located on the inner periphery of the lamp cup 2 and on the top of the lamp cup 2, and the photoelectric panel 4 is located on the overlapping surface. Moreover, when the bulb shell 5 is connected to the lamp cup 2, a bottom surface of the bulb shell 5 can cooperate with the overlapping surface of the lamp cup 2 to form clamping of upper and lower sides of the photoelectric panel 4, and then make the photoelectric panel 4 limited and fixed in an axial direction of the lamp body, which can further enhance the convenience of assembling the lamp body.

Figure 5:
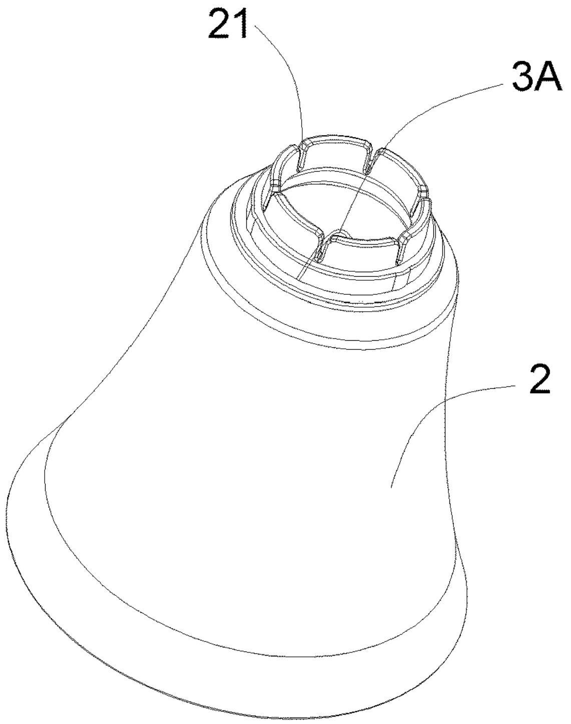
FIG. 5 is a schematic diagram of a snapped connection between a wire clamping groove and a neutral wire disclosed by an example of the present disclosure.
Figure 6:
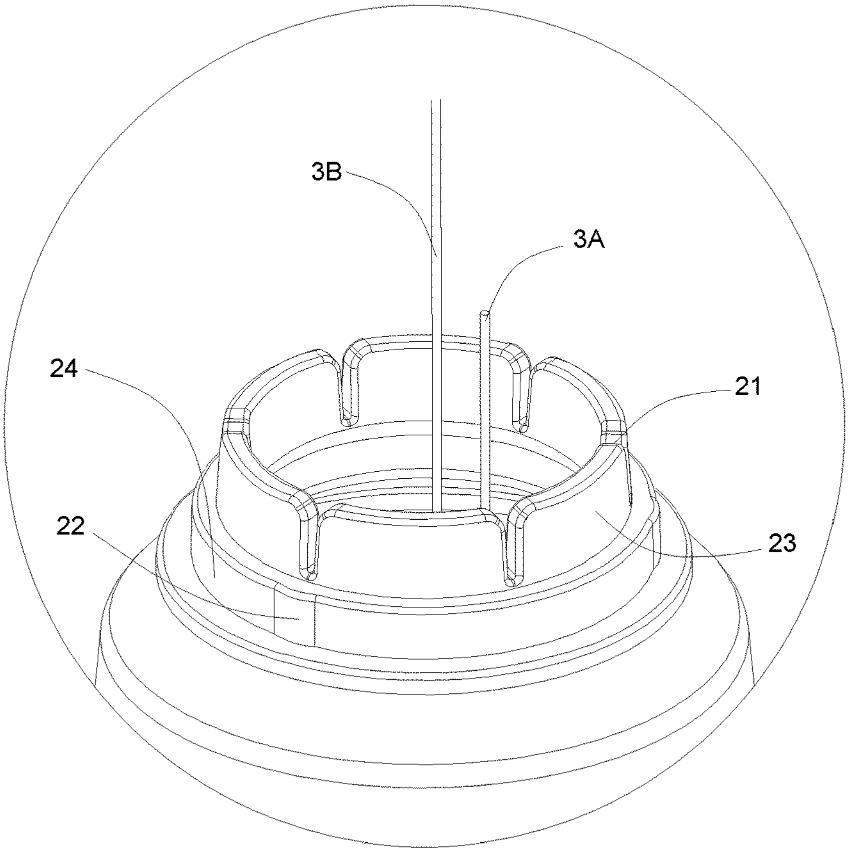
FIG. 6 is a schematic diagram of the layout positions of a live wire and a neutral wire disclosed by an example of the present disclosure.

The lamp cup 2 disclosed by the present example is illustrated in FIG. 5 and FIG. 6. An installation ring platform 23 is protrudingly provided on a bottom end of the lamp cup 2, and the installation ring platform 23 is provided with a plurality of wire clamping grooves 21. The plurality of wire clamping grooves 21 are arranged along a circumferential direction of the installation ring platform 23 and are located in the accommodating cavity of the lamp body. A bayonet is provided on a top of the wire clamping groove 21, and the bayonet is located on a top surface of the installation ring platform 23.

As illustrated in FIG. 1 and FIG. 3, the electric wire 3 includes a neutral wire 3A and a live wire 3B. Both the neutral wire 3A and the live wire 3B are connected to one side of the photovoltaic panel 4 facing the lamp cup 2, so that the photovoltaic panel 4 and the electric wire 3 form a whole, and both ends of the neutral wire 3A are a first end and a second end respectively.

As illustrated in FIG. 3 to FIG. 6, in order to enable the lamp body to emit light, the neutral wire 3A and the live wire 3B need to be inside the lamp cup 2. The neutral wire 3A is snapped into the wire clamping groove 21, the first end of the neutral wire 3A is electrically connected to the photoelectric panel 4, and the second end of the neutral wire 3A is electrically connected to the lamp head 1. Both ends of the live wire 3B are electrically connected to the photoelectric panel 4 and the lamp head 1 respectively, so that an energized circuit is formed among the lamp head 1, the electric wire 3 and the photoelectric panel 4; and the lamp head 1 can lead a current of an external power supply to the photoelectric panel 4 through the electric wire 3, so that the photoelectric panel 4 emits an incident light source to irradiate the bulb shell 5, to make the lamp body emit light through the bulb shell 5.

The photoelectric panel 4 is usually only positioned in an axial direction of the lamp body, and can be rotated arbitrarily in the circumferential direction. Thus, due to arrangement of the plurality of wire clamping grooves 21, no matter what angle the photoelectric panel 4 is rotated to, there will always be a wire clamping groove 21 most adapted to the neutral wire 3A, and this wire clamping groove 21 is closet to the neutral wire 3A than wire clamping grooves 21 in other positions. In this way, the neutral wire 3A can be located between the live wire 3B and the most adapted wire clamping groove 21, so that the neutral wire 3A can be easily snapped into the wire clamping groove 21 while avoiding the interference and blocking of the live wire 3B, thereby completing fixing of the position of the neutral wire 3A, and further enabling the neutral wire 3A to form a permanent and effective electrical connection with the lamp head 1 through the second end.

To sum up, during actual assembly, due to the arrangement of the plurality of wire clamping grooves 21, the photoelectric panel 4 does not need to adjust by a specific angle to make the live wire 3B avoid the neutral wire 3A, and the neutral wire 3A can be snapped into the wire clamping groove 21, which greatly improves the assembly efficiency of the lamp body, and ensures the effective electrical connection between the neutral wire 3A and the lamp head 1 for assembly.

Further, as illustrated in FIG. 5 and FIG. 6, a circular array of the plurality of wire clamping grooves 21 is evenly distributed on the installation ring platform 23, so that the neutral wire 3A can be snapped into the wire clamping grooves 21 more conveniently. Meanwhile, according to a conclusion of actual production experience, the amount of wire clamping grooves 21 is preferably 6, which can reduce difficulty in manufacturing while facilitating the snapped connection.

Figure 4:
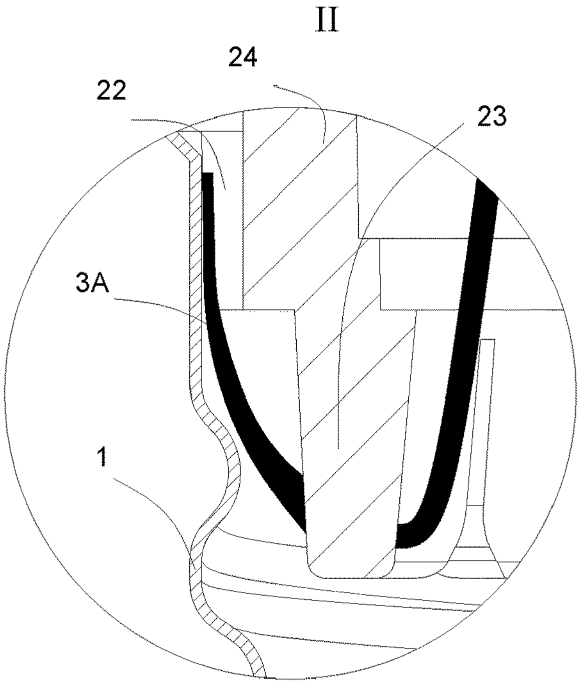
FIG. 4 is an enlarged view at section II of FIG. 3 disclosed by an example of the present disclosure.

More specifically, as illustrated in FIG. 4 to FIG. 6, in order to improve an overall strength of the installation ring platform 23, a preset distance is provided between a bottom of the wire clamping groove 21 and a bottom of the installation ring platform 23. The preset distance makes the installation ring platform 23 a complete ring structure. Meanwhile, the installation ring platform 23 is integrally formed at the bottom of the lamp cup 2, and the thickness of the installation ring platform 23 gradually increases toward the side of the photoelectric panel 4, so that the installation ring platform 23 has a better strength at the end connected to the lamp cup 2, to avoid fracture caused by stress concentration.

Further, a bottom surface of the wire clamping groove 21 is an arc surface, and the arc surface is arranged opposite to the bayonet. The radius of the arc surface may be adapted to the diameter of the neutral wire 3A to prevent scratching of the neutral wire 3A by the wire clamping groove 21. Meanwhile, rounding or blunt treatment can be adopted at an intersection of the wire clamping groove 21 and the installation ring platform 23 to further prevent the wire clamping groove 21 from scratching the neutral wire 3A.

Figure 2:
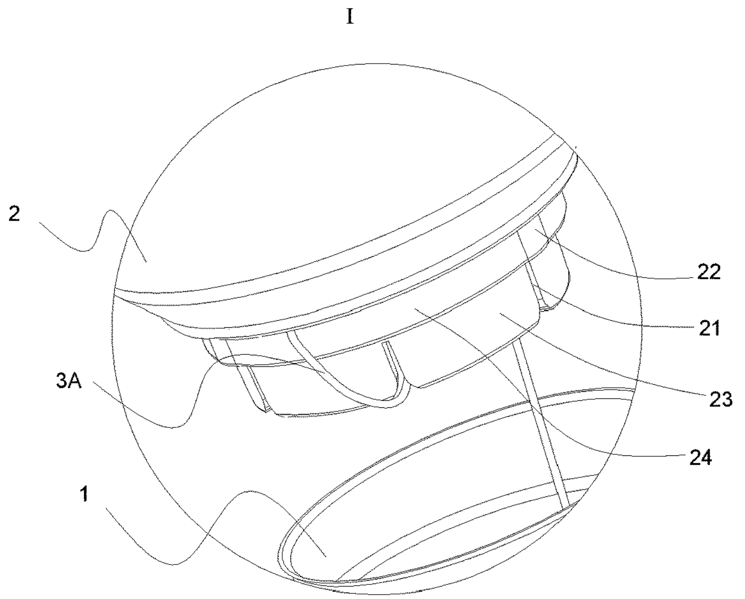
FIG. 2 is an enlarged view at section I of FIG. 1 disclosed by an example of the present disclosure.

In another example, as illustrated in FIG. 2 and FIG. 4, a bend is provided on the neutral wire 3A. The bend is snapped into the wire clamping groove 21, the first end is located on an inner side of the installation ring platform 23, and the second end is located on an outer side of the installation ring platform 23. A spacer cavity is reserved at a junction of the lamp cup 2 and the lamp head 1, and the second end is snapped into the spacer cavity.

The arrangement of the spacer cavity can form accommodation for the second end of the neutral wire 3A, preventing excessive extrusion of the second end by the lamp head 1 and the lamp cup 2; and meanwhile, the bend is usually an elastic deformation, so that the neutral line 3A can use an elastic deformation force generated by the bend to keep the second end in close contact with the lamp head 1.

Further, as illustrated in FIG. 3 and FIG. 4, in order to adapt to the overall structure of the lamp body, the bend is close to the second end, and the neutral wire 3A is of a "J"-shaped hook structure.

As a specific solution for forming the spacer cavity, as illustrated in FIG. 2, FIG. 4 and FIG. 6, an assembly ring portion 24 is further provided on the bottom of the lamp cup 2, and the installation ring platform 23 is protrudingly provided on a top surface of the assembly ring portion 24.

A plurality of clamping blocks 22 are provided on an outer peripheral surface of the assembly ring portion 24, and the plurality of clamping blocks 22 are arranged along a circumferential direction of the assembly ring portion 24, and protrude radially along the assembly ring portion 24.

As illustrated in FIG. 2 to FIG. 4, a port of the lamp head 1 is socketed outside the plurality of clamping blocks 22, and the port of the lamp head 1 is closed by riveting, etc., so that the port of the lamp head 1 is in an interference connection with the assembly ring portion 24 through the plurality of clamping blocks 22. With the design of the plurality of clamping blocks 22, the spacer cavity is formed between the outer peripheral surface of the assembly ring portion 24 and an inner peripheral surface of the lamp head 1.

Further, in order to facilitate the neutral wire 3A snap into the wire clamping groove 21, it should be ensured that the width of the wire clamping groove 21 is greater than the diameter of the neutral wire 3A. In a case of actual production, the width of the wire clamping groove 21 is selected to be 0.6 mm, and the diameter of the neutral wire 3A is 0.5 mm.

The present disclosure discloses a lamp body and a lamp cup thereof, to solve problems of low assembly efficiency and unstable contact of the current lamp body.

In order to solve the above problems, the present disclosure adopts technical solutions below.

A lamp cup is disclosed, an installation ring platform is protrudingly provided on a bottom end of the lamp cup, and the installation ring platform is provided with a plurality of wire clamping grooves; the plurality of wire clamping grooves are arranged along a circumferential direction of the installation ring platform; and a bayonet is provided on a top of the wire clamping groove, and the bayonet is located on a top surface of the installation ring platform.

Further, a circular array of the plurality of wire clamping grooves is evenly distributed on the installation ring platform.

Further, six wire clamping grooves are provided.

Further, a preset distance is provided between a bottom of the wire clamping groove and a bottom of the installation ring platform; and the preset distance makes the installation ring platform a complete ring.

Further, a bottom surface of the wire clamping groove is an arc surface, and the arc surface is arranged opposite to the bayonet.

A lamp body is disclosed, including a lamp head, an electric wire, a photoelectric panel, a bulb shell and the lamp cup; the lamp head, the lamp cup and the bulb shell are sequentially connected to form an accommodating cavity in the interior of the lamp body, and the electric wire and the photoelectric panel are all located in the accommodating cavity; the electric wire includes a neutral wire and a live wire, both ends of the neutral wire are a first end and a second end respectively, the neutral wire is snapped into the wire clamping groove, the first end is electrically connected to the photoelectric panel, and the second end is electrically connected to the lamp head; and both ends of the live wire are electrically connected to the photoelectric panel and the lamp head respectively.

Further, a bend is provided on the neutral wire, the bend is snapped into the wire clamping groove, the first end is located on an inner side of the installation ring platform, and the second end is located on an outer side of the installation ring platform; and a spacer cavity is reserved at a junction of the lamp cup and the lamp head, and the second end is snapped into the spacer cavity.

Further, the bend is close to the second end, and the neutral wire is of a "J"-shaped hook structure.

Further, an assembly ring portion is further provided at a bottom of the lamp cup, and the installation ring platform is protrudingly provided on a top surface of the assembly ring portion; a plurality of clamping blocks are provided on an outer peripheral surface of the assembly ring portion, and the plurality of clamping blocks are arranged along a circumferential direction of the assembly ring portion, and protrude radially along the assembly ring portion; the lamp head is in interference connection with the assembly ring portion through the plurality of clamping blocks; and the spacer cavity is formed between the outer peripheral surface of the assembly ring portion and an inner peripheral surface of the lamp head, and the plurality of clamping blocks are located in the spacer cavity.

Further, the width of the wire clamping groove is greater than the diameter of the neutral wire.

The technical solutions adopted in the present disclosure can achieve beneficial effects below.

In the lamp body and the lamp cup thereof disclosed in the examples of the present disclosure, a contact fixing portion is provided at the bottom of the lamp cup, and the contact fixing portion can effectively avoid the interference of the live wire to the neutral wire through arrangement of a plurality of wire clamping grooves, so that the neutral wire can be installed by selecting the wire clamping groove with an adapted position to ensure effective and stable snapped connection; and when the lamp body is assembled, the photoelectric panel can be rotated to any angle in an assembly plane for installation, improving the installation efficiency of the entire lamp body.

The above-mentioned examples of the present disclosure focus on differences between various examples. As long as different optimization features of the various examples do not contradict each other, they can be combined to form a better example. For brevity, details are not repeated here.

The above are only examples of the present disclosure, and are not intended to limit the present disclosure. Various modifications and variations of the present disclosure will occur to those skilled in the art. Any modification, equivalent replacement, improvement, etc. made within the spirit and principle of the present disclosure shall be included within the scope of the present disclosure.

What is claimed is:

1. A lamp cup, comprising an installation ring platform that is protrudingly provided on a bottom end of the lamp cup, and wherein the installation ring platform is provided with a plurality of wire clamping grooves; and the plurality of wire clamping grooves are arranged along a circumferential direction of the installation ring platform; and a bayonet that is provided on a top of the wire clamping groove, and wherein the bayonet is located on a top surface of the installation ring platform.

2. The lamp cup according to claim 1, wherein a circular array of the plurality of wire clamping grooves is evenly distributed on the installation ring platform.

3. The lamp cup according to claim 1, wherein six wire clamping grooves are provided.

4. The lamp cup according to claim 1, wherein a preset distance is provided between a bottom of the wire clamping groove and a bottom of the installation ring platform; and the preset distance makes the installation ring platform a complete ring.

5. The lamp cup according to claim 1, wherein a bottom surface of the wire clamping groove is an arc surface, and the arc surface is arranged opposite to the bayonet.

6. A lamp body, comprising a lamp head, an electric wire, a photoelectric panel, a bulb shell and a lamp cup; and wherein the lamp cup comprises:

an installation ring platform that is protrudingly provided on a bottom end of the lamp cup, and wherein the installation ring platform is provided with a plurality of wire clamping grooves; and the plurality of wire clamping grooves are arranged along a circumferential direction of the installation ring platform; and a bayonet that is provided on a top of the wire clamping groove, and wherein the bayonet is located on a top surface of the installation ring platform; and wherein the lamp head, the lamp cup and the bulb shell are sequentially connected to form an accommodating cavity, and the wire clamping groove, the electric wire and the photoelectric panel are all located in the accommodating cavity;

the electric wire comprises a neutral wire and a live wire, both ends of the neutral wire are a first end and a second end respectively, the neutral wire is snapped into the wire clamping groove, the first end is electrically connected to the photoelectric panel, and the second end is electrically connected to the lamp head; and both ends of the live wire are electrically connected to the photoelectric panel and the lamp head respectively.

7. The lamp body according to claim 6, wherein a bend is provided on the neutral wire, the bend is snapped into the wire clamping groove, the first end is located on an inner side of the installation ring platform, and the second end is located on an outer side of the installation ring platform; and a spacer cavity is reserved at a junction of the lamp cup and the lamp head, and the second end is snapped into the spacer cavity.

8. The lamp body according to claim 7, wherein the bend is close to the second end, and the neutral wire is of a "J"-shaped hook structure.

9. The lamp body according to claim 7, wherein:

an assembly ring portion is further provided at a bottom of the lamp cup, and the installation ring platform is protrudingly provided on a top surface of the assembly ring portion;

a plurality of clamping blocks are provided on an outer peripheral surface of the assembly ring portion, and the plurality of clamping blocks are arranged along a circumferential direction of the assembly ring portion, and protrude radially along the assembly ring portion;

the lamp head is socketed with the assembly ring portion through the plurality of clamping blocks; and the spacer cavity is formed between the outer peripheral surface of the assembly ring portion and an inner peripheral surface of the lamp head through the plurality of clamping blocks.

10. The lamp body according to claim 7, wherein a width of the wire clamping groove is greater than a diameter of the neutral wire.

* * * * *